United States Patent
Gondkar et al.

(10) Patent No.: US 8,379,845 B2
(45) Date of Patent: Feb. 19, 2013

(54) MULTILAYER ENCRYPTION OF A TRANSPORT STREAM DATA AND MODIFICATION OF A TRANSPORT HEADER

(75) Inventors: Shraddha Gondkar, Richardson, TX (US); Satish Arora, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 695 days.

(21) Appl. No.: 12/487,793

(22) Filed: Jun. 19, 2009

(65) Prior Publication Data
US 2010/0322415 A1 Dec. 23, 2010

(51) Int. Cl.
*H04L 9/00* (2006.01)
(52) U.S. Cl. .......................... 380/42; 380/217
(58) Field of Classification Search .................. 380/42
See application file for complete search history.

(56) References Cited

U.S. PATENT DOCUMENTS

| | | | |
|---|---|---|---|
| 7,167,560 B2* | 1/2007 | Yu | 380/200 |
| 2004/0196972 A1* | 10/2004 | Zhu et al. | 380/45 |
| 2006/0184985 A1* | 8/2006 | LeComte et al. | 725/90 |
| 2009/0122992 A1* | 5/2009 | Kordon et al. | 380/287 |
| 2011/0261957 A1* | 10/2011 | Catrein et al. | 380/42 |
| 2011/0307693 A1* | 12/2011 | Munger et al. | 713/153 |

* cited by examiner

*Primary Examiner* — Krisna Lim
(74) *Attorney, Agent, or Firm* — Mirna Abyad; W. James Brady; Frederick J. Telecky, Jr.

(57) ABSTRACT

Several methods and a system of multilayer encryption of a transport stream data and modification of a transport header are disclosed. An exemplary embodiment provides a method of a multilayer encryption. The method includes further encrypting an initially encrypted transport stream data to generate a multilayer encrypted data using a processor and a memory. The method also includes determining a further encryption flag data. The encryption method modifies a transport header of the multilayer encrypted data. In addition, the encryption method includes the further encryption flag data in an adapted component of a modified transport header.

14 Claims, 4 Drawing Sheets

MULTILAYER ENCRYPTION OF A TRANSPORT STREAM DATA AND MODIFICATION OF A TRANSPORT HEADER

FIELD OF TECHNOLOGY

This disclosure relates generally to multilayer encryption of a transport stream data and modification of a transport header.

BACKGROUND

An encrypted transport stream data may be received. The encrypted transport stream data may include a component to communicate a limited quantity of encryption information with respect to the type of encryption used on the transport stream. After the transport stream data has been decrypted, the encryption may fail to prevent an unauthorized distribution or duplication of the transport stream data. As a result, a source of income may not be realized and substantial losses may occur.

SUMMARY

This Summary is provided to comply with 37 C.F.R. §1.73, requesting a summary of the invention indicating the nature and substance of the invention. It is submitted with the understanding that it will not be used to limit the scope or meaning of the claims.

Several methods and a system of multilayer encryption of a transport stream data and modification of a transport header are disclosed.

An exemplary embodiment provides a method of an encryption. The method includes further encrypting an initially encrypted transport stream data to generate a multilayer encrypted data using a processor and a memory. The method also includes determining a further encryption flag data. The encryption method modifies a transport header of the multilayer encrypted data. Modifying the transport header may include keeping and/or changing the current content of the transport header while differently interpreting the content of the transport header. In addition, the encryption method includes the encryption flag data in an adapted component of a modified transport header.

An exemplary embodiment provides a system of encryption. The system includes a multiple encryption module to further encrypt an initially encrypted transport stream data to generate a multilayer encrypted data using a processor and a memory. The system includes a multiple encryption state module to determine a further encryption flag data. The system also includes a transport stream communication module to modify a transport header of the multilayer encrypted data. Modifying the transport header may include keeping and/or changing the current content of the transport header while differently interpreting the content of the transport header. In addition, the system includes the encryption flag data in an adapted component of a modified transport header.

An exemplary embodiment provides a method. The method includes further encrypting an initially encrypted transport stream data. The encrypted transport stream data generates a multilayer encrypted data using a processor and a memory. The method includes modifying a transport header of the multilayer encrypted data. Modifying the transport header may include keeping and/or changing the current content of the transport header while differently interpreting the content of the transport header. The method also includes indicating a type of an initial encryption using a scramble control field of a modified transport header. In the embodiment, the type of the initial encryption is one or more of a prior encryption key and a changed encryption key. In addition, the method also includes determining a further encryption flag data. The method includes the further encryption flag data in an adapted component of a modified transport header. The adapted component of the transport header includes a single bit of a transport stream priority field. The method includes transmitting the multilayer encrypted data to one or more of a decryption module, a storage module, and an additional memory.

The methods and systems disclosed herein may be implemented in any means for achieving various aspects, and may be executed in a form of a machine-readable medium embodying a set of instructions that, when executed by a machine, causes the machine to perform any of the operations disclosed herein.

Other features will be apparent from the accompanying Drawings and from the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying Drawings and from the Detailed Description that follows.

DETAILED DESCRIPTION

Several methods and a system of multilayer encryption of a transport stream data and modification of a transport header are disclosed. Although the embodiments have been described with reference to specific example embodiments, it will be evident that various modifications and changes may be made to these embodiments without departing from the broader spirit and scope of the various embodiments.

Figure 1:
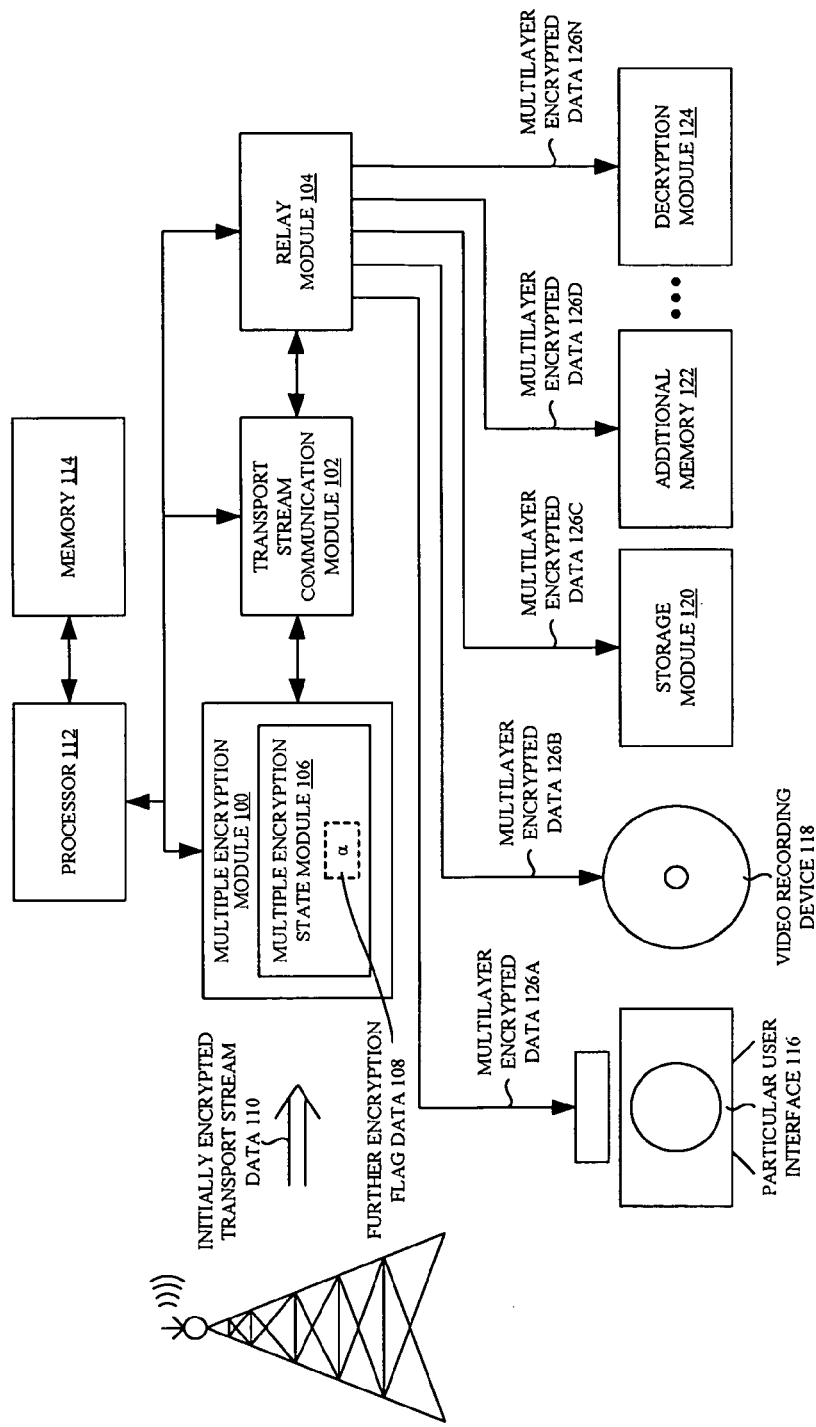
FIG. 1 is a schematic view illustrating multilayer encryption of a transport stream data using a transport header, according to one embodiment.

FIG. 1 is a schematic view illustrating multilayer encryption of a transport stream data using a transport header, according to one embodiment. Particularly, FIG. 1 illustrates a multiple encryption module 100, a transport stream communication module 102, a relay module 104, a multiple encryption state module 106, a further encryption flag data 108, an initially encrypted transport stream data 110, a processor 112, a memory 114, a user interface 116, a video recording device 118, a storage module 120, an additional memory 122, a decryption module 124, and a multilayer encrypted data 126A-N, according to one embodiment.

The initially encrypted transport stream data 110 may be transmitted to the multiple encryption module 100. The multiple encryption module 100 may include the multiple encryption state module 106. The multiple encryption state module 106 may determine the further encryption flag data 108. The multiple encryption module 100 may be communicatively coupled to the processor 112, the transport stream communication module 102 and the relay module 104. The processor 112 may be communicatively coupled to the memory 114.

The relay module 104 may transmit the multilayer encrypted data 126A to the user interface 116. The relay module 104 may transmit the multilayer encrypted data 126B to the video recording device 118. The relay module 104 may transmit the multilayer encrypted data 126C to the storage module 120. The relay module 104 may transmit the multilayer encrypted data 126D to the additional memory 122. The relay module 104 may transmit the multilayer encrypted data 126N to the decryption module 124.

A transport stream data may be initially encrypted to prevent an unauthorized viewer or distributor from decrypting the information. The initial encryption may be a first level of encryption used in accordance with a transport stream standard. Transport stream may be a communications protocol used with audio, video, and data. Transport stream may be a type of digital container format that encapsulates packetized elementary streams and other data. Transport stream may be specified as part of an MPEG-2 standard, and it may allow multiplexing of digital video and audio, and synchronization of an output. The transport stream specification may be ISO/IEC 13818-1. Transport stream may offer features to perform error correction when data is transported over unreliable media. Transport stream may be used in broadcast applications, and it may be used with Digital Video Broadcasting (DVB) and the Advanced Television Systems Committee (ATSC). Digital Video Broadcasting may include a suite of internationally accepted open standards used with digital television. The Advanced Television Systems Committee may refer to a digital television format.

The multiple encryption module 100 may further encrypt an initially encrypted transport stream data 110 to generate a multilayer encrypted data 126. The processor 112 and the memory 114 may be used to generate a multilayer encrypted data 126. The initial encryption of the transport stream data 110 may be linked to an encryption key.

In an embodiment, a type of an initial encryption is indicated using an encryption component of the modified transport header. A scramble control field 240 may be the encryption component, and it may indicate what type of encryption is used in the initial encryption layer or whether the type of initial encryption has changed. A change in the type of initial encryption may be indicated by a change between an odd key and an even key in the scramble control field 240. The change in the type of the initial encryption may be between a prior encryption key and a changed encryption key.

The multiple encryption state module 106 may determine the further encryption flag data 108. A multilayer encrypted data 126 may use the transport header of the initially encrypted transport stream data 110 to indicate whether a second level of encryption exists or has been altered. The further encryption flag data 108 may indicate what encryption key should be used with an additional layer of encryption, how many layers of encryption exist, and which layers of encryption have been changed. The further encryption flag data 108 may be used to indicate whether an additional layer of encryption has been changed along with a change in the initial layer of encryption.

In an embodiment, the further encryption is associated with a particular device, a copying limitation, a frequency of use restriction, and a trial access. The particular device may be a set top box of a particular viewer of content. The particular viewer may have paid to access a content containing a transmitted multilayer encrypted data 126A. The particular device may be the user interface 116. The multilayer encrypted data 126A may include an additional encryption layer associated with the particular device. Another device may lack an additional encryption key associated with the particular device, and another user may be prevented from accessing the data. For example, the decryption module 124 may be restricted from accessing the multilayer encrypted data 126N if it is associated with the user interface 116.

The copying limitation may prevent a video recording device 118 from making a threshold number of copies of a multilayer encrypted data 126B. The copying limitation may prevent the multilayer encrypted data 126C from being stored in the storage module 120 or the multilayer encrypted data 126D from being stored in the additional memory 122. The frequency of use restriction may limit the number of times the multilayer encrypted data 126 may be accessed.

The transport stream communication module 102 may modify a transport header of the multilayer encrypted data 126. The transport header of the multilayer encrypted data may include an extra field included in a transport stream protocol. The purpose of the extra field may have been satisfied, or the extra field may be reassigned to carry an alternate information. The field may include one or more bits. Modifying the transport header may change the bit, or it may reassign the bit to carry the alternate information. Modifying the transport header may keep or discard the information originally stored in the bit. Modifying the transport header may include keeping and/or changing the current content of the transport header while differently interpreting the content of the transport header.

The transport stream communication module 102 may include the further encryption flag data 108 in an adapted component of a modified transport header. The further encryption flag data 108 may be included in the modified transport header by storing information in one or more bits of a field designated by transport stream protocol to carry other information. The adapted component of the modified transport header may be a packet priority field 236 of FIG. 2. The packet priority field 236 may sometimes be used to indicate that the transport packet has a higher priority than other packets with the same packet identification number.

The relay module 104 may transmit the multilayer encrypted data 126 to one or more of the user interface 116, the video recording device 118, the storage module 120, the additional memory 122 and the decryption module 124. The user interface 116 may be a particular set top box and a display, a PC, a television, or another device used to communicate data, audio, or video signals. The video recording device 118 may be a DVD recorder, a PC, or any other video recording device. The additional memory 122 may be a volatile memory or a nonvolatile memory. The storage module 120 may be a hard drive, a RAID (Redundant Array of Independent Disks) system, or a network storage system. The decryption module 124 may be software or hardware, and it may be a part of a user interface 116, a video recording device 118, a mobile device, or a PC.

Figure 2:
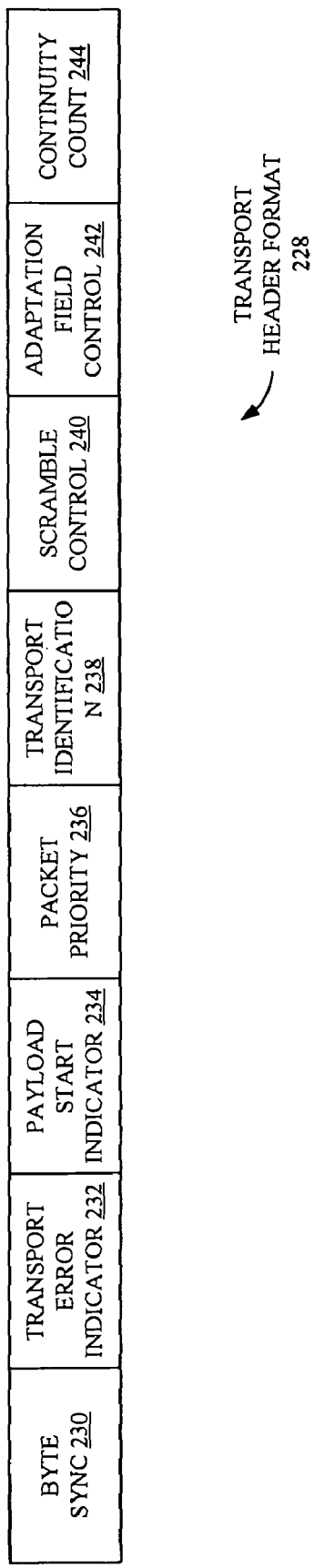
FIG. 2 is an illustration of a transport header format, according to one embodiment.

FIG. 2 is an illustration of a transport header format, according to one embodiment. In particular, FIG. 2 illustrates the transport header format 228, a byte sync field 230, a transport error indicator field 232, a payload start indicator field 234, a packet priority field 236, a transport identification field 238, a scramble control field 240, an adaptation field control 242, and a continuity count field 244, according to one embodiment.

A transport stream communications protocol may divide data to be transmitted into manageable pieces of information and may add a transport header. The byte sync field 230 may be the first byte of a transport packet. The transport error indicator field 232 may indicate whether an error occurred in the transport mechanism. The payload start indicator field 234 may indicate that a Packetized Elementary Stream (PES) is included in a packet. The packet priority field 236 may indicate whether the packet has a higher priority than another packet. The transport identification field 238 may be a 13 bit field used to uniquely identify a packet payload.

The scramble control field 240 may be a two bit field. The two bit scramble control field 240 may convey information about scrambling to a receiving device, such as a user interface 116 or a decryption module 124. When the scramble control field 240 is set to "1 1," it may indicate odd key scrambling. When the scramble control field 240 is set to "1 0," it may indicate even key scrambling. The multilayer encryption may share the scrambling control fields in the transport header with the original encryption. The original encryption may be the initial encryption. The scramble control field 240 may convey whether odd or even keys should be used to decrypt a layer of encryption. The odd or even key may be a prior encryption key or a changed encryption key.

In addition to the scramble control field 240, the multilayer encryption method may use a transport stream priority field in the transport header. The transport stream priority field may be the packet priority field 236. The packet priority field 236 may be modified to indicate whether the scramble control field 240 information also applies to another layer of encryption besides the initial layer. The packet priority field 236 may be used to convey additional information specific to a transport packet. The scramble control field 240 in the multilayer encryption method may also convey information about a key used to perform regular encryption. In addition, whenever a packet priority field 236 bit is set, the scramble control field 240 may also convey the key information used with multilayer encryption.

In an embodiment, when the packet priority field 236 is set to "1," the packet priority field 236 indicates that the scramble control field 240 applies to both regular and multilayer encryption. When the packet priority field 236 is set to "0," the scramble control field 240 applies to regular encryption. This may allow an initial encryption key to be changed while preserving an additional encryption key of an additional encryption layer.

The adaptation field control 242 may be a two bit field that indicates whether an adaptation field is present in the packet. When the adaptation field control 242 is "00," the information may be reserved. When the adaptation field control 242 is "01," the packet may include a payload without an adaptation field. When the adaptation field control 242 is "10," the packet may include an adaptation field without a payload. When the adaptation field control 242 is "11," an adaptation field and a payload may be present. The continuity count field 244 may be 4 bit field.

Figure 3:
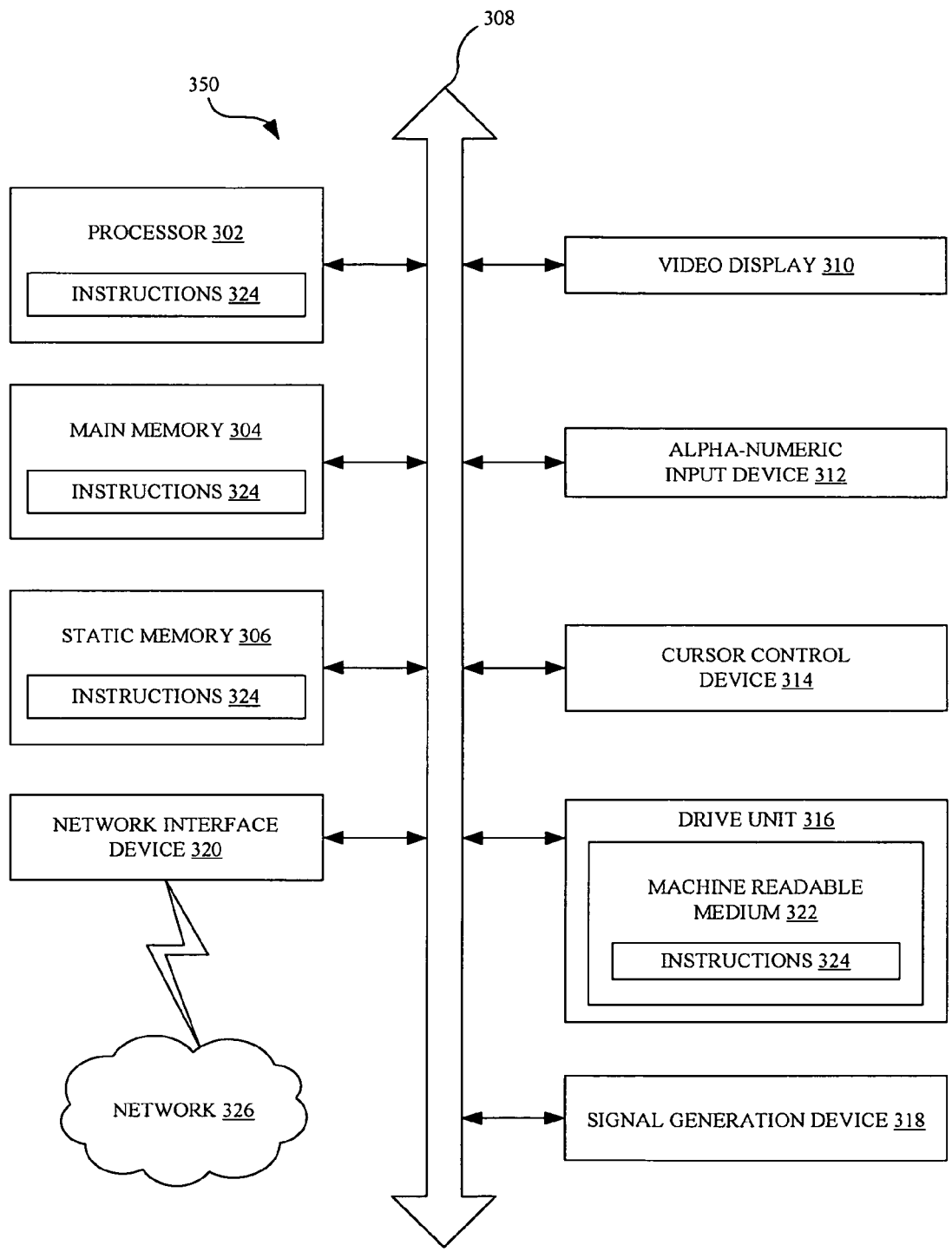
FIG. 3 is a system view of a data processing system in which any of the embodiments disclosed herein may be performed, according to one embodiment.

FIG. 3 is a diagrammatic system view of a data processing system in which any of the embodiments disclosed herein may be performed, according to one embodiment. Particularly, the diagrammatic system view 300 of FIG. 3 illustrates a processor 302, a main memory 304, a static memory 306, a bus 308, a video display 310, an alpha-numeric input device 312, a cursor control device 314, a drive unit 313, a signal generation device 318, a network interface device 320, a machine readable medium 322, instructions 324, and a network 326, according to one embodiment.

The diagrammatic system view 300 may indicate a personal computer and/or the data processing system in which one or more operations disclosed herein are performed. The processor 302 may be a microprocessor, a state machine, an application specific integrated circuit, a field programmable gate array, etc. (e.g., Intel® Pentium® processor). The main memory 304 may be a dynamic random access memory and/or a primary memory of a computer system.

The static memory 306 may be a hard drive, a flash drive, and/or other memory information associated with the data processing system. The bus 308 may be an interconnection between various circuits and/or structures of the data processing system. The video display 310 may provide graphical representation of information on the data processing system. The alpha-numeric input device 312 may be a keypad, a keyboard and/or any other input device of text (e.g., a special device to aid the physically handicapped).

The cursor control device 314 may be a pointing device, such as a mouse. The drive unit 316 may be a hard drive, a storage system, and/or another longer term storage subsystem. The signal generation device 318 may be a bios and/or a functional operating system of the data processing system. The network interface device 320 may be a device that performs interface functions such as code conversion, protocol conversion and/or buffering used with communication to and from the network 326. The machine readable medium 322 may provide instructions on which any of the methods disclosed herein may be performed. The instructions 324 may provide source code and/or data code to the processor 302 to enable any one or more operations disclosed herein.

Figure 4:
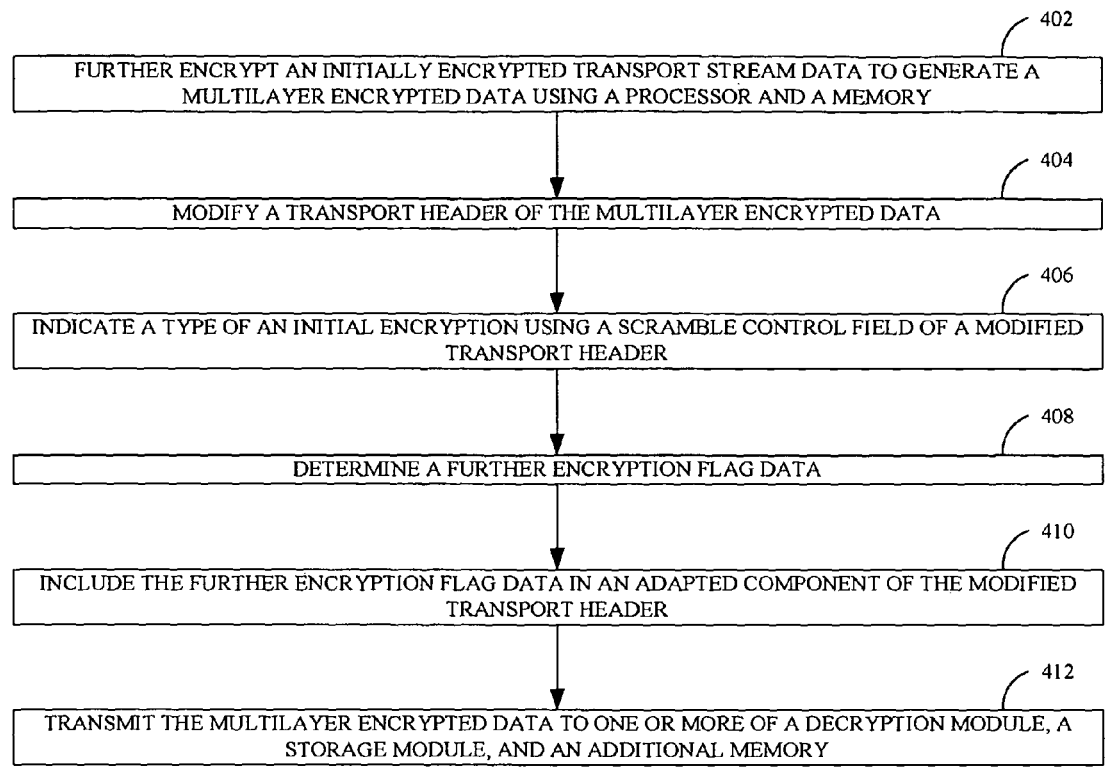
FIG. 4 is a process flow illustrating a multilayer encryption method of a transport stream data using a transport header, according to one embodiment.

FIG. 4 is a process flow illustrating a multilayer encryption method of a transport stream data using a transport header, according to one embodiment. In operation 402, an initially encrypted transport stream data 110 may be further encrypted to generate a multilayer encrypted data 126. A processor 112 and a memory 114 may be used. For example, a multiple encryption module 100 may be used to perform one or more layers of encryption. In operation 404, a transport header of the multilayer encrypted data 126 may be modified. For example, a transport stream communication module 102 may be used to modify a transport header. Modifying the transport header may include keeping and/or changing the current content of the transport header while differently interpreting the content of the transport header.

In operation 406, a type of an initial encryption may be indicated using a scramble control field 240 of a modified transport header. The type of the initial encryption may be one or more of a prior encryption key and a changed encryption key. In operation 408, a further encryption flag data 108 may be determined. A multiple encryption state module 106 may be used to determine the encryption flag data. In operation 410, further encryption flag data 108 may be included in an adapted component of a modified transport header. The adapted component of the transport header may include a single bit of a transport stream priority field. A transport stream communication module 102 may be used to include the further encryption flag data 108 in the single bit of the transport stream priority field. In operation 412, the multilayer encrypted data 126 may be transmitted to one or more of a decryption module 124, a storage module 120, and an additional memory 122. A relay module 104 may be used to transmit the multilayer encrypted data 126.

Although the present embodiments have been described with reference to specific example embodiments, it will be evident that various modifications and changes may be made to these embodiments without departing from the broader spirit and scope of the various embodiments. For example, the various systems, devices, apparatuses, and circuits, etc. described herein may be enabled and operated using hardware circuitry, firmware, software or any combination of hardware, firmware, or software embodied in a machine readable medium. The various electrical structures and methods may be embodied using transistors, logic gates, application specific integrated (ASIC) circuitry or Digital Signal Processor (DSP) circuitry.

Particularly the multiple encryption module 100, the transport stream communication module 102, the relay module 104, the multiple encryption state module 106, the storage module 120, and the decryption module 124 of FIG. 1 may be enabled using software and/or using transistors, logic gates, and electrical circuits (e.g., application specific integrated ASIC circuitry), a multiple encryption circuit, a transport stream communication circuit, a relay circuit, a multiple encryption state circuit, storage circuit, the decryption circuit, and other circuit.

In addition, it will be appreciated that the various operations, processes, and methods disclosed herein may be embodied in a machine-readable medium or a machine accessible medium compatible with a data processing system, and may be performed in any order. Accordingly, the Specification and Drawings are to be regarded in an illustrative rather than a restrictive sense.

What is claimed is:

1. An encryption method, comprising:
    further encrypting an initially encrypted transport stream data to generate a multilayer encrypted data using a processor and a memory;
    determining a further encryption flag data;
    modifying a transport header of the multilayer encrypted data; and
    including the further encryption flag data in an adapted component of a modified transport header.

2. The encryption method of claim 1, further comprising:
    transmitting the multilayer encrypted data to at least one of a decryption module, a storage module, and an additional memory.

3. The encryption method of claim 1, wherein the adapted component of the transport header is comprised of a single bit.

4. The encryption method of claim 3, wherein the adapted component of the transport header is comprised of a transport stream priority field.

5. The encryption method of claim 1, further comprising:
    indicating a type of an initial encryption using an encryption component of the modified transport header.

6. The encryption method of claim 5, wherein the type of the initial encryption is at least one of a prior encryption key and a changed encryption key.

7. The encryption method of claim 6, wherein the encryption component of the modified transport header is a scramble control field.

8. The encryption method of claim 7, wherein the further encryption flag data identifies whether the scramble control field represents a change in the type of further encryption.

9. The encryption method of claim 8, wherein the further encryption is associated with at least one of a particular device, a copying limitation, a frequency of use restriction, and a trial access.

10. The encryption method of claim 5, wherein the further encryption flag data is a single bit of data that indicates whether the encryption component applies to the type of the initial encryption or the type of the initial encryption and the type of a further encryption of the multilayer encrypted data.

11. The encryption method of claim 10, wherein a machine is caused to perform the method of claim 10 by executing a set of instructions embodied by the method of claim 10 in a form of a machine readable medium.

12. An encryption method, comprising:
    further encrypting an initially encrypted transport stream data to generate a multilayer encrypted data using a processor and a memory;
    modifying a transport header of the multilayer encrypted data;
    indicating a type of an initial encryption using a scramble control field of a modified transport header, wherein the type of the initial encryption is at least one of a prior encryption key and a changed encryption key;
    determining a further encryption flag data; and
    including the further encryption flag data in an adapted component of a modified transport header, wherein the adapted component of the transport header is comprised of a single bit of a transport stream priority field;
    transmitting the multilayer encrypted data to at least one of a decryption module, a storage module, and an additional memory.

13. The encryption method of claim 12, wherein the further encryption flag data identifies whether the scramble control field represents a change in the type of further encryption.

14. The encryption method of claim 13, wherein the further encryption flag data is a single bit of data that indicates whether the scramble control field applies to the type of the initial encryption or the type of the initial encryption and the type of a further encryption of the multilayer encrypted data.

* * * * *